Patented Aug. 10, 1937

2,089,398

UNITED STATES PATENT OFFICE 2,089,398

HALOGENATED RUBBER HYDROHALIDE

Eugene W. Moffett, Chicago, Ill., assignor, by mesne assignments, to Marbo Patents Inc., a corporation of Delaware No Drawing. Application July 15, 1935, Serial No. 31,445

10 Claims. (Cl. 260—1)

This invention relates to the reaction products of rubber with hydrogen halides and halogens. More particularly it relates to halogenated rubber hydrohalides, and to an improved process of making such compounds.

It has been proposed to react rubber, including rubber in its undissolved state, with liquefied and with gaseous chloride, as described and claimed in United States Patent No. 1,980,396, in which applicant is a joint inventor. The product obtained with liquefied hydrogen chloride and solid rubber at a low temperature, such as —85° C., is a "soluble type" non-jellying rubber hydrochloride which is soluble in benzol at room temperature to about 7% without gelation and, which in thin sheet form, is readily penetratable by turpentine. According to X-ray analysis the produce is amorphous, and is composed essentially of asymmetrical rubber hydrochloride.

In the application, Serial No. 3,804, in which applicant is a joint inventor, there is disclosed a process of reacting solid rubber with liquefied chlorine. The product obtained by reacting solid rubber with liquefied chlorine at about —30° C. is a type of rubber chloride which is only slightly soluble in solvents such as benzol and toluene, and resistant to turpentine, thus differing radically from rubber chlorides previously known which are soluble even above 20% concentration in benzol and toluene.

It is an object of this invention to produce new types of rubber hydrohalides, including chlorinated soluble type rubber hydrochloride, and chlorinated amorphous rubber hydrochloride.

Another object is to produce a very soluble halogen containing rubber compound, which when made into thin sheets or films is relatively resistant to penetration by turpentine.

Another object is to produce a relatively stable chlorinated rubber hydrochloride.

Another object is to produce chlorinated rubber hydrochloride quickly and economically.

A further object is to produce a chlorinated rubber hydrochloride of greater solubility and capable of forming solution of lower viscosity than hitherto obtainable with chlorinated rubber hydrochlorides.

Other objects will become apparent on reading the specification.

In the present invention soluble type, nonjelling rubber hydrochloride is reacted with chlorine. The preferred procedure is to immerse a thin sheet of rubber in liquefied hydrogen chloride at —85° until it is substantially completely reacted, and then immediately react the soluble type rubber hydrochloride sheet so formed with chlorine, preferably also in the liquefied condition and at low temperature.

By the present invention there is produced a new type of chlorinated rubber hydrochloride in which chlorine is substituted into the soluble low viscosity type of rubber hydrochloride. The product obtained is more soluble and produces solutions of even less viscosity than the soluble type rubber hydrochloride. This is true even when liquefied chlorine at low temperatures of —40° C. is used. The new chlorinated rubber hydrochloride has different properties and appears to be a different compound than old chlorinated rubber hydrochlorides made by successively hydrochlorinating and chlorinating a solution of rubber by means of gaseous hydrogen chloride and chlorine at ordinary temperatures. The product of this invention is designated here and in the claims as chlorinated soluble type rubber hydrochloride, and is believed chemically to be a chlorinated amorphous asymmetrical rubber hydrochloride.

The following example will illustrate the invention, particularly in its application to the making of transparent sheets or films of .001" thickness, suitable for wrapping purposes.

Example I

Pale crepe rubber of approximately .02" thickness is dipped first in liquefied hydrogen chloride at —85° C. and then before expansion takes place, in liquefied chlorine at —40° C. The products dissolve very readily. The sheets or films are made by casting 6% solutions of the reaction product on a surface, drying and stripping. The resistance to turpentine is measured by the time required for turpentine to penetrate the sheets of .001" thickness.

The following table gives the results in concise form:

Table I

| HCl Immersion time | Cl₂ Immersion time | Cl₂ content | Sheet | Turpentine resistance |
|---|---|---|---|---|
| 3 min. | 2 min. | 39.95 | O. K. | 2 hrs. |
| 3 min. | 3 sec. | 33.35 | O. K. | 10 min. |
| 4 min. | 4 min. | 37.35 | O. K. | 45 min. |
| 4 min. | 3 sec. | 34.76 | O. K. | 8 min. |

Soluble type rubber hydrochloride previously made by any method, may be chlorinated with gaseous or liquefied hydrogen chloride. The soluble type rubber hydrochloride may be dissolved in a solvent such as benzol or toluene and chlorinated by passing in gaseous chlorine, preferably at low temperatures such as —20° C., as at the lower temperatures clearer films and more stable films of chlorinated rubber hydrochloride may be produced. However, the soluble type rubber hydrochloride may be chlorinated in the solid or semi-solid state in thin sheets or in mass to produce a solid chlorinated soluble type rubber hydrochloride which may then be dissolved, if desired.

The chlorinated rubber hydrochloride of the present invention may also be mixed with stabilizers such as magnesium oxide, litharge, with particular advantage especially for calendering, molding and for dissolving to form solutions suitable for casting and coating.

Milling of chlorinated rubber hydrochloride, preferably with magnesium oxide to obtain solutions of reduced viscosity is broadly disclosed in Winkelmann application, Serial No. 25,807, filed June 10, 1935. The new type of chlorinated rubber hydrochloride of this invention may be so milled. There results a chlorinated soluble type rubber hydrochloride of greatly reduced viscosity.

It is within the bounds of this invention, however, to mill soluble type rubber hydrochloride preferably with stabilizers such as magnesium oxide, to obtain a soluble type rubber hydrochloride of reduced viscosity and then react the product so obtained with chlorine, preferably liquefied chlorine whereby a chlorinated soluble type rubber hydrochloride of further reduced viscosity is obtained. The advantage of the latter procedure is that it does away with the milling of chlorinated rubber hydrochlorides which in general are less stable than rubber hydrochlorides and gives a chlorinated rubber hydrochloride of greater solubility and capable of forming solutions of lower viscosity than hitherto obtainable.

It is to be understood that many details of the present invention may be varied without departing from its principles. Any rubber, including scrap, reclaim, partially vulcanized rubber may be used. The term rubber as used in the claims is intended to include rubber and equivalent materials for the purpose described, including gutta percha, balata, methyl rubber. Also other halogen and hydrohalides than chlorine and hydrogen chloride may be used.

The term "soluble type" rubber hydrochloride should not be confused with the rubber hydrochlorides of the prior art, which are generally made by passing gaseous hydrogen chloride in rubber solutions, and which are soluble in benzol at 20° C. to less than 3%. The soluble type rubber hydrochlorides also differ from rubber hydrochlorides made with solid rubber and gaseous hydrogen chloride at ordinary or elevated temperatures. In general, the soluble type rubber hydrochloride may be defined as a rubber hydrochloride which is soluble in benzol at 20° C. to 7%, and which does not gel out of benzol. It is preferably made by treating solid rubber with liquefied hydrogen chloride at around —85° C. It is believed that at least some of this product is made even at temperatures as high as —35° C. However, it is not proposed to limit the soluble type rubber hydrochloride to any particular method of production, and it is not proposed to limit this invention to the chlorination of soluble type rubber hydrochloride alone.

It is also within the bounds of this invention that instead of reacting the rubber successively with hydrogen chloride followed by chlorine, the reaction may be carried out with mixtures of liquefied hydrogen chloride and liquefied chlorine. The reaction of solid rubber and chlorine takes place quicker and probably in preference to the reaction with hydrogen chloride. The addition of hydrogen chloride to the chlorine appears to slow up the reaction with chlorine. The reaction product is mainly rubber chloride until the proportion of chlorine is less than about 20%, as evidenced by the insolubility of the product. The best results for casting and coating of solutions are obtained with approximately 145 parts of liquefied hydrogen chloride to 5 parts of chlorine to about 11 parts chlorine, the mixtures being at atmospheric pressures and low temperatures. The rubber is exposed to such mixtures for about 15 minutes. For this time of exposure the sheets have no core of unreacted rubber. The chlorine content of the product is about 38%; sheets made from it are hard, clear, and resistant to turpentine for about 20 minutes. The product is believed to be chlorinated rubber hydrochloride, although the straight chlorination reaction may take place to greater or less extent depending on the proportion of chlorine present in the mixture.

I claim:

1. A halogenated amorphous rubber hydrohalide.

2. A chlorinated amorphous rubber hydrochloride.

3. A chlorinated soluble type amorphous rubber hydrochloride.

4. A thin film or sheet comprising a chlorinated soluble type amorphous rubber hydrochloride.

5. The method of producing a low viscosity soluble type halogenated rubber hydrohalide which comprises reacting an amorphous rubber hydrohalide with a halogen.

6. The method of producing a low viscosity soluble type chlorinated rubber hydrochloride which comprises reacting an amorphous rubber hydrochloride with chlorine.

7. The method of producing a low viscosity soluble type chlorinated rubber hydrochloride which comprises reacting rubber with a mixture of hydrogen chloride and chlorine at a temperature below —35° C.

8. The method of producing a low viscosity soluble type chlorinated rubber hydrochloride which comprises reacting rubber with a mixture of liquefied hydrogen chloride and chlorine at a temperature below —35° C.

9. The method of producing a low viscosity soluble type halogenated rubber hydrochloride which comprises reacting rubber with hydrogen chloride at a temperature below —35° C., and reacting said reaction product with a halogen.

10. The method of producing a low-viscosity soluble type chlorinated rubber hydrochloride which comprises contacting thin masses of rubber with liquefied hydrogen chloride at a temperature below —35° C., and subjecting the reaction product so obtained to the action of chlorine.

EUGENE W. MOFFETT.